3,158,592
METHOD OF MANUFACTURE OF FURFURYL ALCOHOL CONDENSATES
Erik R. Nielsen, 1481 Brown St., Des Plaines, Ill.
No Drawing. Filed Jan. 10, 1961, Ser. No. 81,695
7 Claims. (Cl. 260—88.5)

This invention relates to furfuryl alcohol resin intermediates. More particularly, it relates to the formation of a furfuryl alcohol resin intermediate or partial condensate by the use of activated alumina, and in the absence of acids.

The polymers of this invention are low viscosity condensates resulting from the intermolecular condensation of furfuryl alcohol and have a relatively narrow range of molecular weights. The polymers of low viscosity are particularly adapted for use in corrosion resistant cements, as impregnants, as binders, and as coatings. The narrow molecular weight range of the polymers is responsible for the low viscosity of the condensates which is highly advantageous for the various applications, but, in addition, polymers with a narrow molecular weight range respond more uniformly to reactants, such as thermosetting agents, than do polymers with a wide molecular weight range.

The invention is particularly directed to a practical polymerization reaction in which for purposes of obtaining a high yield of low molecular weight polymers, furfuryl alcohol monomer is vaporized and the vapors contacted with alumina catalyst to effect the condensation reaction. Moreover, in achieving rapid and high conversion, the amounts of catalyst need not be limited to relatively small amounts as when the catalyst is in contact with a reacting liquid mixture of monomeric furfuryl alcohol and polymeric forms of furfuryl alcohol ranging from dimers, trimers, etc., up to the higher molecular weight polymers.

It is known that furfuryl alcohol will resinify or condense without catalysts, upon application of heat. It was shown by Dunlop and Peters (Industrial and Engineering Chemistry, vol. 34, pages 815–817) that less than 4% of monomer is converted to dimer when furfuryl alcohol is heated to about 300° F. for about 3 hours. Heating to 482° F. for 3 hours dimerizes less than about 20% of the furfuryl alcohol. Such methods of heating without catalyst, it will be immediately apparent, fail in any practical heating period to effect a high degree of conversion of monomeric furfuryl alcohol to polymeric condensates.

It is also known in the art to produce furfuryl alcohol partial condensates or intermediates, by heating furfuryl alcohol in the presence of an acidic catalyst and of a solvent which serves to moderate the potentially violent reaction, such solvent usually being water. In forming such polymerized intermediates according to prior art practices, the furfuryl alcohol is carefully heated with the catalyst and the solvent until a viscous liquid is obtained, the reaction being terminated when an approximate predetermined viscosity is reached.

Such a viscous liquid produced by an acid catalyzed reaction is usually a mixture of monomeric furfuryl alcohol and polymeric forms of furfuryl alcohol of a wide range of molecular weights. In order to lower the viscosity of the condensate mixtures, resulting from a reaction wherein a high degree of conversion of furfuryl alcohol is obtained, to a point where it is practical to subject the mixtures to additional processing steps such as neutralization, washing, blending, etc., the condensates are diluted with monomeric furfuryl alcohol. The furfuryl alcohol solutions of high viscosity mixtures of furfuryl alcohol polymers have limited utility in coatings, cements, adhesives, etc., because the high content of monomeric furfuryl alcohol is responsible for the high shrinkage and tendency for porosity in coatings, and adhesive bonds based on such solutions.

It is further known that condensates can be produced by intermolecular condensation of furfuryl alcohol in the presence of an activated alumina catalyst which are stable intermediates. If the alumina catalyzed condensation reaction has been carried to the point of substantially complete conversion of monomeric furfuryl alcohol to polymeric forms of furfuryl alcohol, the product is a mixture of polymers of a wide range of molecular weights. The stable intermediates whose components are substantially completely polymeric materials exhibit a high viscosity varying from a heavy syrup to a stiff tar. The viscosities of these condensates are high due to the broad range of polymers present which includes a substantial amount of high molecular weight and, therefore, high viscosity polymers.

Now it has been discovered that the polymerization of furfuryl alcohol can be accelerated to take place substantially smoothly and can be controlled to provide polymers with a relatively uniform degree of polymerization by feeding furfuryl alcohol to a catalyst zone comprising activated alumina under such conditions of temperature that intermolecular condensation of the furfuryl alcohol takes place, the water of condensation is vaporized and taken off from the top of the catalyst bed, and the condensate formed is a liquid which can be taken off from the bottom of the catalyst bed. The reaction may be carried out in its initial stages, at temperatures and pressures at which substantially only vapors of furfuryl alcohol contact the catalyst. At later stages of condensation, the reaction may be carried out under temperature and pressure conditions, i.e., subatmospheric pressures whereby vapors consisting essentially of dimers, trimers, etc., can be successively brought into contact with the catalyst and condensed to form higher molecular weight polymers of a limited range of molecular weights. Preferably the initial reaction is carried out at approximately atmospheric pressure and at temperatures between about 250° F. and 400° F. and usually at a temperature slightly above the approximate boiling point of commercial furfuryl alcohol, namely, about 325° F. to 329° F.

The method of condensing and polymerizing furfuryl alcohol may be carried out either as a batch operation or as a continuous operation.

In general, the condensation of a batch of furfuryl alcohol to produce a low viscosity polymeric product of a relatively narrow range of molecular weights is carried out by heating a body of furfuryl alcohol to a temperature effecting volatilization of monomeric furfuryl alcohol. The vapors of furfuryl alcohol are contacted with activated alumina held in a catalyst zone out of contact with the liquid being heated to volatilization temperatures. The vapors contacting the activated alumina are subject to intermolecular condensation whereby water is split out in accordance with a well-known reaction.

The water split out in the condensation reaction is vaporized at the temperature of the reaction. The water vapors together with substantially all of the unreached furfuryl alcohol pass out of the catalyst zone to a condenser system cooled in the conventional manner. The condensate is accumulated in a trap where the water and furfuryl alcohol form separate layers. Water which is the top layer may be discharged to waste and the furfuryl alcohol may be returned to the body of furfuryl alcohol being heated, or to the cantalyst zone.

The liquid product of the condensation of furfuryl alcohol may be returned for mixing with the body of furfuryl alcohol being heated. As the quantity of products of intermolecular condensation accumulated in the body of furfuryl alcohol being heated increases, the boiling point of the resultant mixture increases until at about 410° F. a product may be obtained which is substantially free of unreacted monomeric furfuryl alcohol.

If the method of condensing and polymerizing furfuryl alcohol is to be run continuously to produce a furfuryl alcohol condensation product of a relatively narrow range of molecular weight polymeric material, the process usually will be carried out by heating a body of furfuryl alcohol to a temperature initially which effects volatilization of furfuryl alcohol. The furfuryl alcohol vapors are contacted with granular activated alumina in a catalyst zone maintained above about 250° F. Water vapors and some of the unreacted furfuryl alcohol vapors are removed from the catalyst zone for condensation in a system such as is described for the batch process. A liquid polymeric product of furfuryl alcohol condensation is withdrawn from said catalyst zone. This polymeric product may be heated in the second heating zone to gradually increase the temperature so that initially, any furfuryl alcohol present in the polymeric product is volatilized. These furfuryl alcohol vapors are contacted with the granular activated alumina in a second catalyst bed. The liquid product formed by the condensation reaction in the second catalyst zone is returned for mixing with the polymeric product being heated until the boiling point of the product in the second heating zone indicates substantially complete conversion of furfuryl alcohol.

If the relatively low molecular weight polymeric forms of furfuryl alcohol are to be condensed, the mixture in the second heating zone is subjected to coordinated temperatures and subatmospheric pressure through which the lower polymeric forms of furfuryl alcohol are volatilized, or the low molecular weight polymers are fed hot, but in the liquid state to a catalyst zone maintained in the range of 250° F. to 400° F., preferably 350° F. to 400° F. The condensation products resulting from the heating of polymer material may be returned to the second heating zone or to a separate receiver. Low molecular weight polymeric products formed by condensation of furfuryl alcohol may have a viscosity of the order of 200 to 1500 centipoises measured on a Brookfield Viscometer, but by further condensation of the low molecular weight polymeric materials, products having a viscosity as high as 250,000 centipoises may be attained.

The activated alumina useful for effecting the intermolecular condensation of furfuryl alcohol is preferably gamma alumina. Gamma alumina is characterized by being a distinct form of alumina, activated to the gamma form by heating the same aluminous material as is conventional in the formation of aluminas but to a critical temperature range, such as from about 700° F. to 1100° F. Gamma alumina has a distinct crystalline structure as compared, for example, to alpha alumina which, starting with the same material, has not been heated to the same degree.

The most active gamma catalyst alumina for my purpose is an active alumina which has been prepared by heating neutral hydrous alumina from about 900° F. to 1100° F., preferably about 1000° F. The difference of activities of the active aluminas commercially available shows up as taking a longer or shorter period to effect the desired catalytic furfuryl alcohol dehydration. Thus, for example, a substantially pure activated gamma alumina which has been heated to about 1000° F. may take as little as one half the time of reaction necessary to effect the same degree of condensation as an active alumina which has been activated by heating to about 800° F.

Where the activated alumina contains other forms of alumina such as alpha alumina its activity is substantially decreased depending upon the quantity of this inactive alumina which is present. For example, an activated alumina which is a mixture with more than about 50% of inactive alpha alumina will have lost its catalytic activity substantially entirely. With less than about 50% of inactive alpha alumina the mixture of alpha and gamma aluminas is useful in accordance with the present invention. And the utility increases as the concentration of gamma alumina increases.

The activated alumina is available commercially in various particle sizes varying from fine dust or the so-called "fluid" activated alumina to coarse fragments up to about 2 inches. In carrying out the condensation method of this invention, the particle size of the activated alumina is selected so as to provide a packed reaction column with sufficient interstitial space to permit liquid condensates to flow countercurrent to vapors while the vapors are not appreciably hindered in passing over or up through the body of activated alumina. For small units, a particle size of 8 to 14 mesh is preferred, but for larger units, the preferred particle size is from ¼" to 2".

A column or tower packed with the granular alumina is adapted for passage of vapors therethrough by being connected to a reservoir capable of holding an appreciable quantity of liquid, said reservoir being provided with means for heating the liquid to a predetermined temperature.

In order to maintain optimum reaction conditions in the packed tower, the tower is usually provided with means for controlling the temperature of the catalyst. It is desirable that the temperatures maintained be such that the polymeric material formed will not be vaporized but will be condensed whereas all of the water split out by the condensation reaction will be vaporized and will pass together with at least some of the furfuryl alcohol vapors to a separate condensing system.

While the condensation reaction may be brought about by contact of vapors with catalyst heated soleby by contact with the vaporized stock, the vaporization may be carried out at one temperature while the catalyst is maintained at another temperature by suitable means of heating or cooling, for example, by jacketing the catalyst zone with heating means.

Vapors issuing from the catalyst zone, as explained previously, will contain water vapor and furfuryl alcohol vapors. In the preferred mode of operation, the vapors are condensed and the liquid flows into a suitable trap where the liquid separates into a water layer and a furfuryl alcohol layer. Water may be discharged from the trap to waste continuously or periodically. Furfuryl alcohol may be returned to the reservoir continuously or as a batch transfer operation.

Alternatively, the mixture of furfuryl alcohol vapors and water vapor may be passed through a rectifying column. Furfuryl alcohol liquid recovered as a bottom product from the rectifying column may be returned to the reservoir through the catalyst tower or by a suitable by-pass conduit.

In still another variation of the process for converting monomeric furfuryl alcohol into a mixture of predominantly low molecular weight polymers of low viscosity, adapted for continuous operation, the furfuryl alcohol vaporizing kettle delivers vapors to a catalyst zone or tower maintained at a temperature such that water split out by the intermolecular condensate reaction and substantially all of the unreacted furfuryl alcohol pass overhead from the catalyst zone as vapors. Polymeric forms of furfuryl alcohol which condense in the catalyst zone are withdrawn therefrom to a polymer receiver separate from the kettle containing the monomeric furfuryl alcohol. Low molecular weight polymeric material plus a minor amount of unreacted furfuryl alcohol may be treated subsequently to eliminate the unreacted furfuryl alcohol and/or to further polymerize the polymeric forms of furfuryl alcohol, for example, to condense the dimer component of the mixture.

In all of these alternative procedures, the quantity of alumina in the catalyst zone may vary widely relative to the amount of furfuryl alcohol in the vaporizing kettle.

While not intending to be limited by any theory of operation of the catalyst, the activity of the catalyst appears to be based on surface activity. For this reason, inasmuch as the reaction is a dehydration, the moisture formed in the condensation reaction appears to be adsorbed on the surface of the catalyst. This moisture apparently is vaporized and withdrawn with the furfuryl alcohol vapors, thus continuously reactivating the alumina catalyst to maintain the surface thereof relative moisture free.

In general, the larger the amount of catalyst, the faster the conversion of furfuryl alcohol to polymeric forms. For example, utilizing alumina in an amount constituting 10% by weight of the furfuryl alcohol in the vaporizing vessel, the same degree of condensation may be attained in less than 3 hours as may be effected in 6 hours using 1.8% by weight of catalyst in the catalyst zone. Amounts of catalyst are used which usually vary from about 1% to 15% by weight of the furfuryl alcohol.

The invention will be more fully understood from the following examples which are given by way of illustration and without any intention that the invention be limited thereto.

*Example I*

1500 parts by weight of furfuryl alcohol is introduced into a suitable container. The container and contents are heated by a bath adapted for close control of temperatures in the range between about 300° F. and 450° F. and uniform heating is maintained by suitable stirring equipment.

Vapors of furfuryl alcohol are passed upward through a vertically positioned column containing 27 parts by weight of granular alumina of a particle size of about 8 to about 14 mesh. The column is provided with a liquid trap running parallel to the catalyst zone. A condenser or so-called "cold finger" at the top of the column condenses vapor.

When both water vapor and furfuryl alcohol vapors are being condensed, the condensed material accumulates in the trap and separates into two layers. Water is discharged to waste and the furfuryl alcohol is returned to the furfuryl alcohol container.

The boiling temperature of a furfuryl alcohol stock is between 325° F. and 329° F. After vaporization of furfuryl alcohol starts, it requires contact between the catalyst and vapors for about 20 minutes before the catalyst is heated to a temperature where it is effective in promoting the condensation reaction. At the end of 1 hour of contacting catalyst with alcohol vapors, the contents of the container boil at approximately 341° F. The container contents at this stage has a viscosity of 4 to 5 centipoises measured on a Brookfield Viscometer at room temperature of approximately 77° F. The container contents is about 60% unconverted furfuryl alcohol.

Continuing the heating for 6 hours can cause the boiling point of the container contents to rise to about 375° F. At this stage, the furfuryl alcohol is about 86% converted to condensates and the viscosity of the solution is still only about 56 centipoises.

Continuing the heating until the boiling temperature of the container contents rises to about 410° F. results in the production of a product which is substantially devoid of unreacted monomeric furfuryl alcohol. The condensate has a viscosity of approximately 1000 centipoises measured by a Brookfield Viscometer at room temperature.

*Example II*

The apparatus described in Example I was altered by increasing the amount of alumina packed in the catalyst zone to 150 parts by weight.

1500 parts by weight of furfuryl alcohol was introduced into the container. The furfuryl alcohol was brought to a temperature of 330° F. in about 20 minutes and the heating was continued with gradual increase in temperature for 3 hours. At this time, the boiling point of the container contents was approximately 410° F. The container contents was substantially free of unreacted monomeric furfuryl alcohol and had a viscosity of only 400 centipoises.

*Example III*

The container or kettle for heating furfury alcohol was provided with a distilling column which in turn was connected to a condenser and to a liquid trap, the standard apparatus used in azeotropic distillation for separation of water as an azeotrope with a liquid heavier than water. The kettle also was provided with an agitator to keep the catalyst suspended in the liquid.

1500 grams of furfuryl alcohol was placed in the heating vessel together with 150 grams of gamma alumina which has been heated at about 1000° F. and used in particles of about 8–14 mesh sizes available as "grade F–10" from Aluminum Company of America.

The agitated liquid was heated, and when the temperature had reached about 275° F., the condensation reaction started. As the condensation proceeded, the temperature of the boiling reaction mixture rose gradually.

The trap became filled with liquid distilled over from the distilling column. This liquid separated into two layers. The water was discharged to waste and the furfuryl alcohol layer was returned to the heating vessel for further condensation.

Periodically, the water separated in the condenser was measured and a sample of the contents of the heating vessel was removed for measurement of viscosity on a Brookfield Viscometer at 77° F.

The tests showed the following results:

| Heating in Hours | Percent Water Split Out (Based on Amount of Furfuryl Alcohol) | Viscosity of Condensate Centipoises at 77° F. |
|---|---|---|
| 1 | 11.2 | 720 |
| 2 | 12.0 | 5,000 |
| 4 | 13.0 | 10,000 |
| 6 | 15.0 | 250,000 |

The kettle contents having a viscosity of 250,000 centipoises was substantially free of monomeric furfuryl alcohol. The liquid contents of the kettle was screened hot to remove the alumina catalyst and then cooled.

Comparison of the time for complete reaction for the products of Examples I and II shows that increasing the quantity of catalyst drastically reduces the time for complete reaction of furfuryl alcohol.

When comparing the viscosity of the products of Examples II and III (400 centipoises v. 10,000 centipoises), the methods of preparation of which utilize the same ratio by weight of alumina to furfuryl alcohol and carry condensation to the same endpoint, namely, substantial freedom from monomeric furfuryl alcohol, it becomes apparent that the product prepared in accordance with this invention is a polymeric material of markedly lower viscosity, an indication of a predominance of, if not consisting entirely of, condensates falling within a narrow range of molecular weights, i.e., dimers, trimers, and the like.

These new, low viscosity condensates containing substantially no unreacted furfuryl acohol, are particularly adapted for use as the resinous component of impregnants, coatings, castings, etc. The low viscosity of the condensates permits mixing to attain uniform distribution of components admixed therewith. Moreover, the low viscosity of the condensates coupled with the substantial freedom from monomeric furfuryl alcohol renders the condensates particularly useful in the coating field. The coatings in liquid form will flow to smooth layers and cure to solid continuous films free from deleterious porosity generally associated with coatings prepared from furfuryl alcohol solutions of condensates of furfuryl alcohol. In addition, the low viscosity condensates are amenable to cross linking, for example, by polyfunctional amines, amides, etc., to produce thermoset coatings of exceptional chemical inertness, flexibility and an ability to adhere to non-porous surfaces such as metallic surfaces.

The new low viscosity condensates are useful also as the resinous component of corrosion-resistant cements. The liquid furfury alcohol condensate component of cements is a dilute furfuryl alcohol solution of furfuryl alcohol condensates with a broad range of molecular weights. As is well known, the speed with which a furfuryl alcohol condensate cures with an acid catalyst decreases as the molecular weight of the condensate goes up. The cement must cure with an acid catalyst without the application of heat, and this condition is met by keeping the condensate content low in the liquid component. While the monomeric furfuryl alcohol present will cure rapidly, without application of heat, it also gives rise to porosity and shrinkage. When using a furfuryl alcohol solution of the new low viscosity condensates of this invention, the amount of resinous component may be increased due to the greater reactivity of the low viscosity condensates and, as a result, the tendency for porosity and shrinkage is decreased. Such a liquid component for corrosion-resistant cement may be made according to Example II by stopping the reaction when the desired amount of condensate has been formed, or it may be produced by dissolving the condensates of this example in furfuryl alcohol.

While this is a detailed description of the method of producing condensates of a relative small range of molecular weight condensates, it should be understood that numerous revisions and modifications may be effected without departing from the true scope and novel concepts of the invention, as indicated in the appended claims.

I claim:

1. The method of condensing furfuryl alcohol comprising heating furfuryl alcohol to a temperature effecting volatilization of furfuryl alcohol, contacting the furfuryl alcohol vapors with granular activated alumina in a catalyst zone communicating with but separate from the zone of heating of furfuryl alcohol and containing between about 1% and about 20% of activated alumina by weight of the furfuryl alcohol being heated, said catalyst being maintained at a temperature above about 250° F., removing from the catalyst zone in the form of vapors the water split out by the intermolecular condensation of furfuryl alcohol and at least a portion of the unreacted furfuryl alcohol and withdrawing a liquid product of furfuryl alcohol condensation from said catalyst zone.

2. The method of condensing furfuryl alcohol comprising heating furfuryl alcohol to a temperature effecting volatilization of the monomeric alcohol, contacting the furfuryl alcohol vapors with granular activated alumina which has been activated by heating alumina to a temperature in the range between about 700° F. and 1100° F., said catalyst zone being in communication with but separate from the zone of heating of furfuryl alcohol, said catalyst being maintained at a temperature above about 250° F. removing from the catalyst zone in the form of vapors the water split out by the intermolecular condensation of furfuryl alcohol and at least a portion of the unreacted furfuryl alcohol and withdrawing the liquid product of furfuryl alcohol condensation from said catalyst zone.

3. The method of condensing furfuryl alcohol comprising heating furfuryl alcohol to a temperature effecting volatilization of furfuryl alcohol, contacting the furfuryl alcohol vapors with activated alumina in a catalyst zone communicating with but separate from the zone of heating of furfuryl alcohol, said catalyst being maintained at a temperature above about 250° F. removing from the catalyst zone in the form of vapors the water split out by the intermolecular condensation of furfuryl alcohol and at least a portion of the unreacted furfuryl alcohol, withdrawing a liquid polymeric product of furfuryl alcohol condensation from said catalyst zone, mixing said liquid polymeric product with the body of furfuryl alcohol being heated, continuing the heating of the mixture whereby furfuryl alcohol and lower boiling components of the mixture are volatilized successively in accordance with their boiling points, contacting volatilized material with said activated alumina, withdrawing the liquid condensate from said catalyst zone, mixing said liquid condensate with the mixture being heated and continuing the formation of liquid condensate until the resultant mixture attains a predetermined viscosity.

4. The method of condensing furfuryl alcohol comprising heating furfuryl alcohol to a temperature effecting volatilization of monomeric furfuryl alcohol, contacting the furfuryl alcohol vapors with activated alumina particles having an average screen mesh size in the approximate range of 4 mesh to 2 inches in a catalyst zone communicating with but separate from the zone of heating of furfuryl alcohol and containing between about 1% and about 20% of activated alumina by weight of the furfuryl alcohol being heated, said catalyst being maintained at a temperature above about 250° F., to effect intermolecular condensation of the furfuryl alcohol, removing from the catalyst zone in the form of vapors the water split out by the intermolecular condensation of furfuryl alcohol and at least a portion of the unreacted furfuryl alcohol and withdrawing a liquid product of furfuryl alcohol condensation from said catalyst zone.

5. The method of condensing furfuryl alcohol comprising heating furfuryl alcohol to a temperature effecting volatilization of monomeric furfuryl alcohol, contacting the furfuryl alcohol vapors with activated alumina which has been activated by heating alumina to a temperature in the range between about 700° F. and 1100° F., in a catalyst zone communicating with but separate from the zone of heating of furfuryl alcohol and containing between about 1% and about 20% of activated alumina by weight of the furfuryl alcohol being heated, said catalyst being maintained at a temperature above about 250 F., to effect intermolecular condensation of the furfuryl alcohol, removing from the catalyst zone in the form of vapors the water split out by the intermolecular condensation of furfuryl alcohol and at least a portion of the unreacted furfuryl alcohol and withdrawing a liquid product of furfuryl alcohol condensation from said catalyst zone, mixing the liquid product with furfuryl alcohol being heated and continuing the heating to volatilize components boiling below about 410° F. at atmospheric pressure.

6. The method of condensing furfuryl alcohol comprising heating furfuryl alcohol to a temperature effecting volatilization of monomeric furfuryl alcohol, contacting the furfuryl alcohol vapors with activated alumina in a catalyst zone communicating with but separate from the zone of heating of furfuryl alcohol, said catalyst being maintained at a temperature above about 250° F. to effect intermolecular condensation of the furfuryl alcohol, removing from the catalyst zone in the form of vapors the water split out by the intermolecular condensation of furfuryl alcohol and at least a portion of the unreacted furfuryl alcohol and recovering a liquid polymeric product substantially free of monomeric furfuryl alcohol.

7. The method of condensing furfuryl alcohol to a stable intermediate stage comprising heating the furfuryl alcohol to a temperature effecting volatilization of said alcohol, contacting the furfuryl alcohol vapors with activated alumina in a catalyst zone having vapor communication with the liquid furfuryl alcohol being heated and maintained at a temperature above about 250° F. to effect intermolecular condensation of the furfuryl alcohol and to vaporize the water of condensation, removing from the catalyst zone the water split out by the intermolecular condensation and at least a portion of the unreacted furfuryl alcohol in the form of vapors, withdrawing a liquid product of furfuryl alcohol condensation from said catalyst zone, mixing said liquid condensation product with the furfuryl alcohol being heated, and continuing the heating of this mixture until the boiling temperature of said mixture is approximately 410° F., indicating substantially complete elimination of monomeric furfuryl alcohol.

References Cited in the file of this patent

UNITED STATES PATENTS

| | | |
|---|---|---|
| 2,681,896 | Nielson | June 22, 1954 |
| 2,698,319 | Brown et al. | Dec. 28, 1954 |